United States Patent
Nakagawa et al.

(10) Patent No.: US 10,363,890 B2
(45) Date of Patent: Jul. 30, 2019

(54) ELECTRONIC DEVICE, WORKING MACHINE, AND MANAGEMENT SYSTEM FOR TERMINATION RESISTOR

(71) Applicant: KUBOTA CORPORATION, Osaka (JP)

(72) Inventors: Takao Nakagawa, Osaka (JP); Susumu Umemoto, Osaka (JP); Keisuke Miura, Osaka (JP); Yushi Matsuzaki, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 165 days.

(21) Appl. No.: 15/103,066

(22) PCT Filed: Feb. 26, 2015

(86) PCT No.: PCT/JP2015/055556
§ 371 (c)(1),
(2) Date: Jul. 12, 2017

(87) PCT Pub. No.: WO2015/129795
PCT Pub. Date: Sep. 3, 2015

(65) Prior Publication Data
US 2016/0304039 A1 Oct. 20, 2016

(30) Foreign Application Priority Data

Feb. 27, 2014 (JP) .................................. 2014-036888
Feb. 27, 2014 (JP) .................................. 2014-036889

(51) Int. Cl.
*B60R 16/027* (2006.01)
*G06F 13/40* (2006.01)
(Continued)

(52) U.S. Cl.
CPC ............ *B60R 16/027* (2013.01); *A01B 76/00* (2013.01); *G06F 13/4068* (2013.01); *H01C 13/00* (2013.01); *H04L 25/0278* (2013.01)

(58) Field of Classification Search
CPC ....... B60R 16/027; A01B 76/00; H01C 13/00; G06F 13/4068; H04L 25/0278
See application file for complete search history.

(56) References Cited

U.S. PATENT DOCUMENTS 6,523,070 B1 2/2003 Stapleton et al.
2016/0254925 A1* 9/2016 Riedel ................. G06F 13/4068
710/110

FOREIGN PATENT DOCUMENTS

JP 04-247742 9/1992
JP 06-77964 3/1994
(Continued)

OTHER PUBLICATIONS

International Search Report issued in PCT Application No. PCT/JP2015/055556, dated May 19, 2015.
(Continued)

*Primary Examiner* — Yuen Wong
(74) *Attorney, Agent, or Firm* — Greenblum & Bernstein, P.L.C.

(57) ABSTRACT

To easily perform setting (connection and non-connection) of a termination resistor. An electronic device configured to be connected to an in-vehicle network of a working machine and to work for the working machine, includes: a termination resistor configured to be connected to the in-vehicle network; a switch part configured to be switched between a connection state where the termination resistor is connected to the in-vehicle network and a non-connection state where the termination resistor is not connected to the in-vehicle
(Continued)

network; and a control part configured to control an switching operation of the switch part.

8 Claims, 14 Drawing Sheets

(51) Int. Cl.
    *A01B 76/00*     (2006.01)
    *H01C 13/00*     (2006.01)
    *H04L 25/02*     (2006.01)

(56) References Cited

FOREIGN PATENT DOCUMENTS

| | | |
|---|---|---|
| JP | 2001-518244 | 10/2001 |
| JP | 2005-340945 | 12/2005 |
| JP | 2008-160533 | 7/2008 |
| JP | 2009-163681 | 7/2009 |
| JP | 2010-258877 | 11/2010 |

OTHER PUBLICATIONS

Japanese Office Action issued in Counterpart Patent Appl. No. 2014-036888, dated May 9, 2017.
Japanese Office Action issued in Counterpart Patent Appl. No. 2014-036889, dated May 9, 2017.

* cited by examiner

Fig.3

First table

| ID number (Identification information) | Control device (Electronic device) | Connection determination command |
|---|---|---|
| ID=000 | First control device | Connection command |
| ID=100 | Second control device | Non-connection command |
| ID=200 | Third control device | Non-connection command |
| ID=300 | Fourth control device | Connection command |

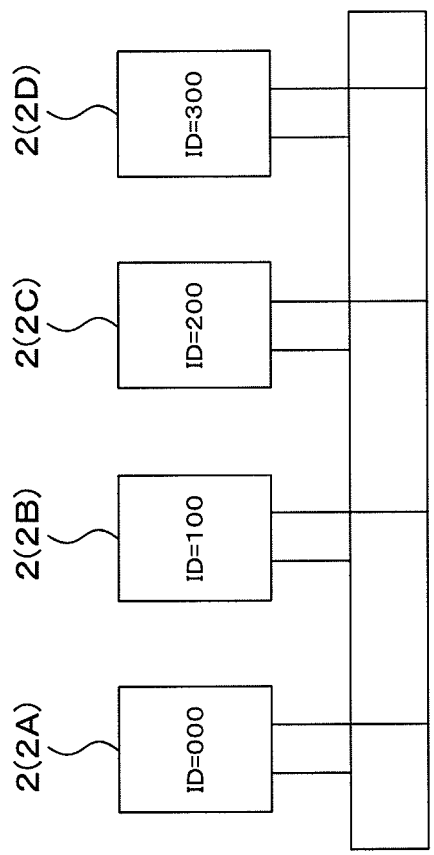

Fig.6

| ID number (Identification information) | Connection determination command |
|---|---|
| ID=000 | Connection command |
| ID=100 | Non-connection command |
| ID=200 | Non-connection command |
| ID=300 | Non-connection command |
| ID=400 | Connection command |

Fig.9

Second configuration table
Machine identification information:M135-0154889

| ID number (Identification information) | Connection determination command |
|---|---|
| ID=000 | Connection command |
| ID=100 | Non-connection command |
| ID=200 | Non-connection command |
| ID=300 | Non-connection command |
| . | . |
| . | . |
| . | . |
| ID=800 | Non-connection command |
| ID=900 | Non-connection command |
| ID=1000 | Connection command |

10A: ID=100, ID=200
10B: ID=800, ID=900

ELECTRONIC DEVICE, WORKING MACHINE, AND MANAGEMENT SYSTEM FOR TERMINATION RESISTOR

TECHNICAL FIELD

The present invention relates to an electronic device mounted on a working machine such as an agricultural machine and a construction machine, the working machine, and a management system for a termination resistor.

BACKGROUND ART

It is previously known that a working machine such as an agricultural machine mounts a plurality of electronic devices and connects the electronic devices each other to configure an in-vehicle network. A termination resistor is connected to the in-vehicle network in order to make a communication steady.

For example, an agricultural machine (a working vehicle) disclosed in Patent document 1 mounts a plurality of controllers (electronic devices), and at least two of the plurality of controllers each includes termination resistors. In this manner, the agricultural machine disclosed in Patent document 1 tries to make a communication steady.

CITATION LIST

Patent Literature

[Patent Literature 1] Japanese Unexamined Patent Application Publication No. 2010-258877.

SUMMARY OF INVENTION

Technical Problem

In the agricultural machine, for example, various types of implements each including controllers are attached to and detached from the agricultural machine, corresponding to a type of agricultural working. The attachment and detachment of the implements changes the number of and locations of the electronic devices included in the agricultural machine, and thus the number of and locations of the termination resistors may also change, the termination resistors being connected to the in-vehicle network. In the change of the number and the location, the controller is required to be reconfigured by setting the termination resistors to be valid or invalid, the termination resistors being included in the controller. The agricultural machine disclosed in Patent document 1 includes, in the controller, a manual switch between the termination resistor and a communication line of the in-vehicle network, the manual switch being configured to switch the termination resistor. The switching of the manual switch sets the termination resistor to be valid or invalid, thereby reconfiguring the controller. Meanwhile, in detachment of the controller including the termination resistor, it is required to additionally prepare a unit having a termination resistor and to connect the unit to the in-vehicle network.

As described above, the working machine such as the agricultural machine is required to reset the termination resistor when the implement and the like is attached to and detached from the working machine; accordingly, the conventional technique has to switch the manual switch and has to connect the unit as described above, resulting in so much troublesome operation in the connection of the termination resistor.

In consideration of the above mentioned problems, the present invention intends to provide an electronic device, a working machine, and a management system for a termination resistor, each being capable of easily setting (connecting and disconnecting) the termination resistor.

Solution to Problem

To solve the above-mentioned technical problems, techniques that the present invention provides are characterized in the following points.

An electronic device of the present invention, the electronic device being configured to be connected to an in-vehicle network of a working machine and to work for the working machine, includes: a termination resistor configured to be connected to the in-vehicle network; a switch part configured to be switched between a connection state where the termination resistor is connected to the in-vehicle network and a non-connection state where the termination resistor is not connected to the in-vehicle network; and a control part configured to control an switching operation of the switch part.

The electronic device includes: a storage part configured to storage a command for setting the termination resistor to the connection state or a command for setting the termination resistor to the non-connection state. The control part switches the switch part to the connection state when the command for setting the termination resistor to the connection state is stored in the storage part, and switches the switch part to the non-connection state when the command for setting the termination resistor to the non-connection state is stored in the storage part.

The control part switches the switch part to the connection state when the command for setting the termination resistor to the connection state is inputted from an outside, and switches the switch part to the non-connection state when the command for setting the termination resistor to the non-connection state is inputted from the outside.

The control part controls an switching operation of the switch part based on first identification information given to an own electronic device and on second identification information given to another electronic device connected to the in-vehicle network.

A working machine of the present invention includes: an electronic device configured to be connected to an in-vehicle network of the working machine and to work for the working machine, the electronic device including: a termination resistor configured to be connected to the in-vehicle network; a switch part configured to be switched between a connection state where the termination resistor is connected to the in-vehicle network and a non-connection state where the termination resistor is not connected to the in-vehicle network; and a control part configured to control an switching operation of the switch part; and a working tool configured to move based on an operation of the electronic device.

A management system for a termination resistor of the present invention, includes: a plurality of electronic devices each including: the termination resistor configured to be connected to an in-vehicle network of a working machine, the plurality of electronic devices being arranged on the in-vehicle network; and a setting unit configured to set connection of the termination resistor based on a position of the electronic device on the in-vehicle network, the termination resistor being included in the electronic device.

The setting unit includes: a position calculation part configured to calculate a position of the electronic device based on identification information given to the electronic device, the electronic device corresponding to the identification information, the position being on the in-vehicle network; and a connection setting part configured to set the connection of the termination resistor based on the position calculated by the position calculation part.

The position calculation part obtains the identification information of the electronic devices arranged on the in-vehicle network at an interval of predetermined time or at changing of number of the electronic devices connected to the in-vehicle network, and calculates the position of the electronic device corresponding to the identification information, the position being on the in-vehicle network.

The connection setting part outputs a connection command to the electronic device, of the plurality of electronic devices connected to the in-vehicle network, located on a termination side of the in-vehicle network, the connection command being related to the termination resistor included in the electronic device.

At least one of the electronic devices connected to the in-vehicle network includes the setting unit, and the electronic device having the setting unit outputs a connection determination command to the other electronic devices, the connection determination command being related to the termination resistor.

The setting unit is disposed on an external device capable of communicating with the electronic device connected to the in-vehicle network, and the external device outputs a connection determination command to the electronic device arranged on the in-vehicle network, the connection determination command being related to the termination resistor.

Advantageous Effects of Invention

According to the electronic device and the working machine of the present invention, the control part switches the switch part, thereby setting the connection of the termination resistor, the termination resistor being configured to be connected to the in-vehicle network. As described above, in the working machine such as an agricultural machine, number of and arrangement of the electronic devices can be changed by attachment and detachment of implements and the like, the electronic devices being connected to the in-vehicle network, and thus the connection state of the termination resistor to the in-vehicle network may be changed. Even in that case, the switch part and the control part can easily switch the termination resistor to the non-connection state and to the connection state arbitrarily, thereby making the communication steady.

According to the electronic device, the connection of the termination resistor can be easily changed only by making the storage part store the command for the connection state or the command for the non-connection state.

According to the electronic device, the connection of the termination resistor can be easily changed only by inputting a command (a command for the connection state and a commend for the non-connection state) from the outside to the control part.

According to the electronic device, the electronic device located on the termination side can be specified by using the first identification information and the second identification information even when number of and arrangement of the electronic devices are changed, the electronic devices being connected to the in-vehicle network. And, the switch part is switched in the electronic device located on the termination side, and thus the termination resistor can be connected to the in-vehicle network.

Meanwhile, in the working machine such as an agricultural machine, number of and arrangement of the electronic devices are changed by attachment and detachment of implements and the like, the electronic devices being connected to the in-vehicle network, and thus the connection state of the termination resistor to the in-vehicle network is changed. Even in that case, in the management system for the termination resistor of the electronic device according to the present invention (also referred to as a management system for a termination resistor), the setting (connection and non-connection) of the termination resistor included in the electronic device can be easily performed by the setting unit. In addition, the communication can be made steady.

According to the management system for the termination resistor, a position of the electronic device can be easily obtained by using the identification information allocated to the electronic device, and, for example, the termination resistor of the electronic device located on the termination side can be in the connection state, and the termination resistor of the electronic device not located on the termination side can be in the non-connection state.

According to the management system for the termination resistor, the position of the control device can be checked at an interval of predetermined time, the control device being connected to the in-vehicle network, and the setting (connection and non-connection) of the termination resistor can be easily performed on the basis of the positional relation at the checking. In addition, the positional relation of the electronic device can be confirmed even when number of the electronic devices are changed, the electronic devices being connected to the in-vehicle network, and the setting (connection and non-connection) of the termination resistor can be easily performed on the basis of the positional relation at the confirmation.

According to the management system for the termination resistor, the termination resistor included in the electronic device can be easily connected to the in-vehicle network, the electronic device being located on the termination side of the in-vehicle network.

According to the management system for the termination resistor, the arrangement of all the electronic devices on the in-vehicle network can be confirmed by one electronic device of the plurality of electronic devices connected to the in-vehicle network. In addition, the setting (connection and non-connection) of the termination resistor can be easily performed by the one electronic device, the termination resistor being included in the other electronic device.

According to the management system for the termination resistor, the arrangement of all the electronic devices on the in-vehicle network can be confirmed by an external device. In addition, the setting (connection and non-connection) of the termination resistor can be easily performed by the external device, the termination resistor being included in the other electronic device.

BRIEF DESCRIPTION OF DRAWINGS

FIG. 3 is an explanation view explaining a relation between an ID number and a connection determination command;

FIG. 5A is a view showing a case where the number of electronic devices mounted on a tractor is four;

FIG. 6 is an explanation view explaining a relation between an ID number and a connection determination command in the case where the number of electronic devices mounted on the tractor is five;

FIG. 9 is an explanation view explaining a second configuration table;

DESCRIPTION OF EMBODIMENTS

Embodiments of the present invention will be described below based on drawings.

First Embodiment

Figure 1:
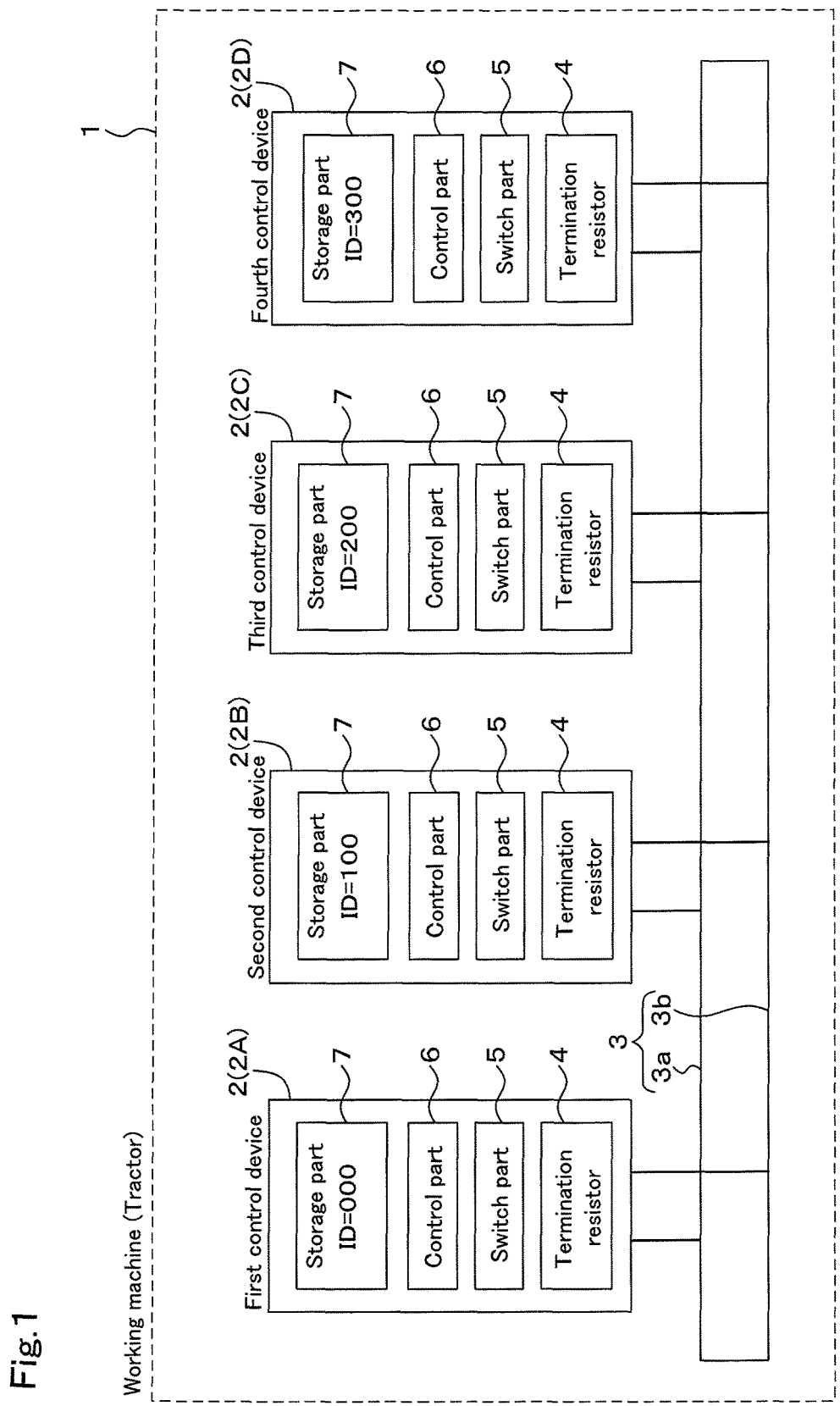
FIG. 1 is an overall view of an in-vehicle network according to a first embodiment of the present invention.

FIG. 1 is an overall view of an in-vehicle network of electronic devices mounted on a working machine.

As shown in FIG. 1, a plurality of electronic devices 2, that is, electric components are mounted on a working machine 1 such as an agricultural machine and a construction machine, the electronic devices 2 working for the working machine 1. The electronic devices 2 are connected to each other by a communication line 3 to constitutes an in-vehicle network. The in-vehicle network is, for example, the CAN (Controller Area Network), the LIN (Local Interconnect Network), the FlexRay, or the like.

In particular, when the in-vehicle network is the CAN, the communication line 3 is constituted of a first communication line 3a and a second communication line 3b, the first communication line 3a serving as the CANH, the second communication line 3b serving as the CANL. The electronic devices 2 are connected to the first communication line 3a and the second communication line 3b.

Then, a termination resistor 4 has to be connected between the first communication line 3a and the second communication line 3b in order to stabilize a communication. In the first embodiment, the termination resistor 4 is disposed on at least one of the electronic devices 2, thereby intending to stabilize the communication.

The termination resistor 4 to be connected to the in-vehicle network will be explained in detail below. For convenience in the following explanation, the working machine 1 is a tractor representing as the agricultural machine, and the electronic devices 2 are control devices mounted on the tractor 1.

Figure 13:
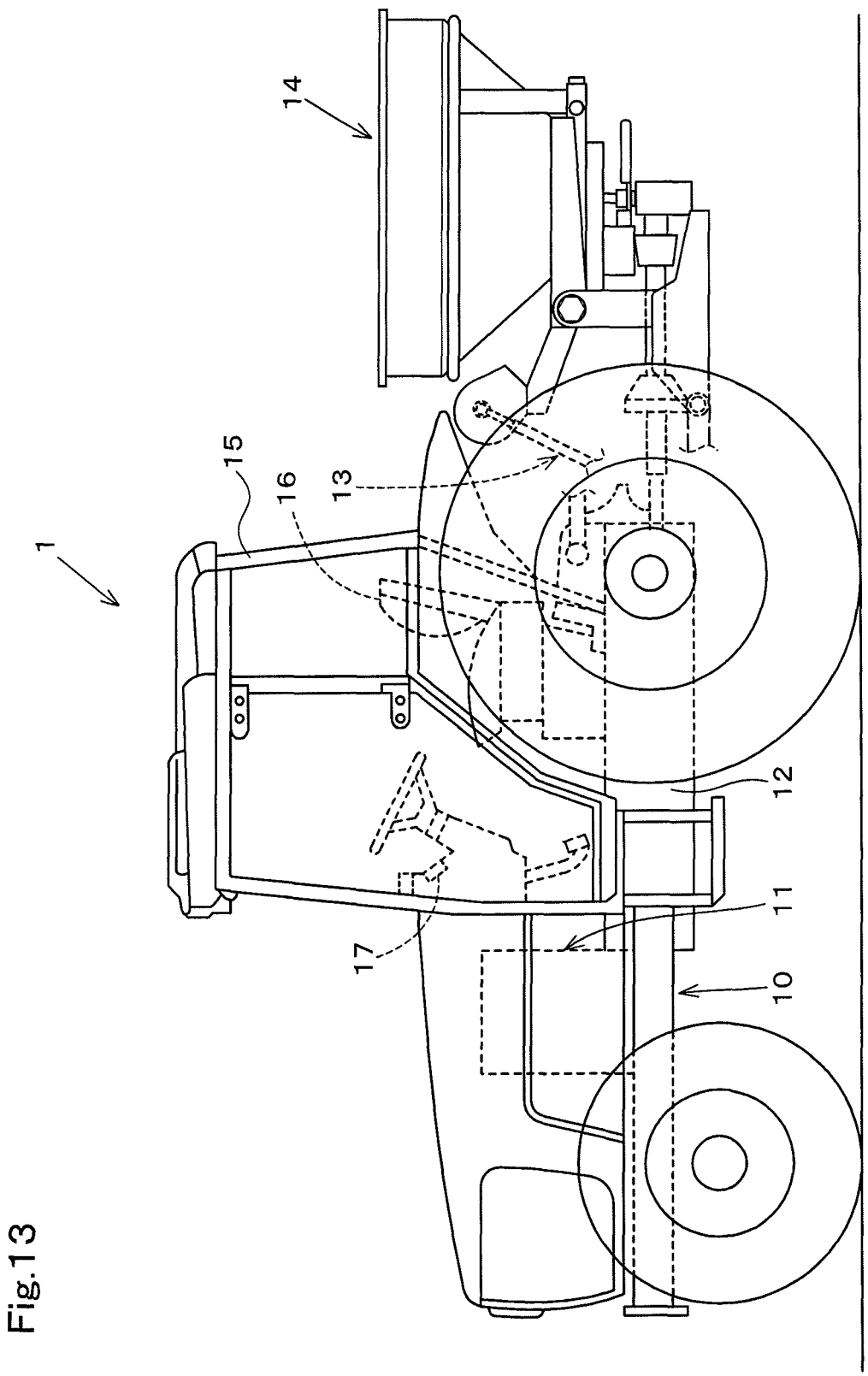
FIG. 13 is an overall side view of a tractor according to the embodiments.

As shown in FIG. 13, the tractor 1 includes a travel body 10, the travel body 10 having wheels on the front of and the rear of the travel body 10. An engine (for example, a diesel engine) 11, a transmission gearbox 12, and the like is mounted on the travel body 10. A three-point linkage 13 is disposed on a rear portion of the travel body 10, the three-point linkage 13 being configured to be lifted up and pulled down. A working tool 14 for a work, that is, an implement can be freely attached to and detached from the three-point linkage 13. A motive power from the engine 11 is transmitted to the working tool 14 via a PTO shaft, and the motive power drives the working tool 14 such as a cultivator, a seeder, a spreader, and a harvester. A cabin 15 of an independently-mounted type is disposed in rear of the engine 11, and an operator seat 16 is disposed in the cabin 15. A display device 17 is disposed around the operator seat 16, the display device 17 being configured to display information related to the operation and the work.

As shown in FIG. 1, the control devices (the electronic devices) 2 each are: a first control device 2A configured to mainly control a whole of the tractor 1; a second control device 2B configured to control the engine 11; a third control device 2C configured to control the display device 17; and a fourth control device 2D configured to control the working tool 14, and the first control device 2A, the second control device 2B, the third control device 2C, and the fourth control device 2D are connected to the in-vehicle network (the communication lines 3).

The first control device 2A is a device configure to control the whole of the tractor 1. An operation amount of an accelerator pedal, a shift lever position, an upper limit value of an engine revolution speed, an operation amount of an accelerator lever, and the like, for example, are inputted to the first control device 2A, the operation amount of an accelerator pedal being obtained when the accelerator pedal is operated, the shift lever position being obtained when the shift lever for gear change is operated. Meanwhile, each of the operation amount of an accelerator pedal, the shift lever position, and the operation amount of the accelerator lever is detected by a positioning sensor and the like. The upper limit value of the engine revolution speed is set by a volume, the volume being disposed near the operator seat 16.

The first control device 2A calculates the engine revolution speed based on the inputted operation amount of the accelerator pedal, and outputs the calculated engine revolution speed as a control signal to the second control device 2B. In addition, the first control device 2A calculates a gear change value based on the inputted shift lever position, and outputs the calculated gear change value as a control signal to the transmission gearbox 12, thereby controlling the transmission gearbox 12.

Moreover, the first control device 2A outputs the inputted upper limit value of the engine revolution speed as a control signal to the second control device 2B. The first control device 2A outputs the engine revolution speed as a control signal to the second control device 2B, the engine revolution speed corresponding to the operation amount of the accelerator pedal, when the inputted operation amount of the accelerator pedal is equal to or more than the operation amount of the accelerator lever. In addition, the first control device 2A does not output the engine revolution speed to the second control device 2B, the engine revolution speed corresponding to the operation amount of the accelerator pedal, when the inputted operation amount of the accelerator pedal is less than the operation amount of the accelerator lever. In addition to the above description, the first control device 2A outputs an operation amount of a lift lever as a control signal to a lift drive part to control the lifting of the three-point linkage 13. Furthermore, the control by the first control device 2A is not limited to the above described examples.

The second control device 2B is a device referred to as an engine control unit. The second control device 2B outputs the control signals to an injector, a common rail, a supply pump, and the like to control the engine 11, the control signals being outputted from the first control device 2A and being calculated based on signals of the engine revolution speed, a crank position, a cam position, and the like. Meanwhile, the engine control in the second control device 2B is the same as a general diesel engine control. For example, in the control for the injector, the second control device 2B outputs a control signal to the injector, the control signal indicating an fuel injection amount, an injection timing, and a fuel injection rate. Additionally, in the control for the supply pump or for the common rail, the second control device 2B outputs a signal to the supply pump or the common rail, the signal indicating the fuel injection pressure and the like.

Various types of input information (for example, the engine revolution speed, a PTO revolution speed, the gear change value, a vehicle speed, a fuel level, and a water temperature) is inputted to the third control device 2C through the in-vehicle network and the like, the input information relating to the operation and the work. The third control device 2C outputs a control signal to the display device 17 to control the display device 17, the control signal indicating a display mode for the input information.

The fourth control device 2D is a device disposed on the working tool 14, and outputs, for example, a seeding amount as a control signal to a drive part of the seeder when the working tool 14 is the seeder to control the seeding amount of the seeder, the seeding amount being synchronized with (related to) the vehicle speed. In addition, the fourth control device 2D is not limited to the device disposed on the seeder, and may be any device for controlling the working tool 14, the working tool 14 being capable of freely attached to and detached from the tractor 1.

Then, as showing in FIG. 1, the electronic devices 2 (the control devices 2), that is, each of the first control device 2A, the second control device 2B, the third control device 2C, and the fourth control device 2D includes the termination resistor 4, a switch part 5, a control part 6, and a storage part 7.

Figure 2:
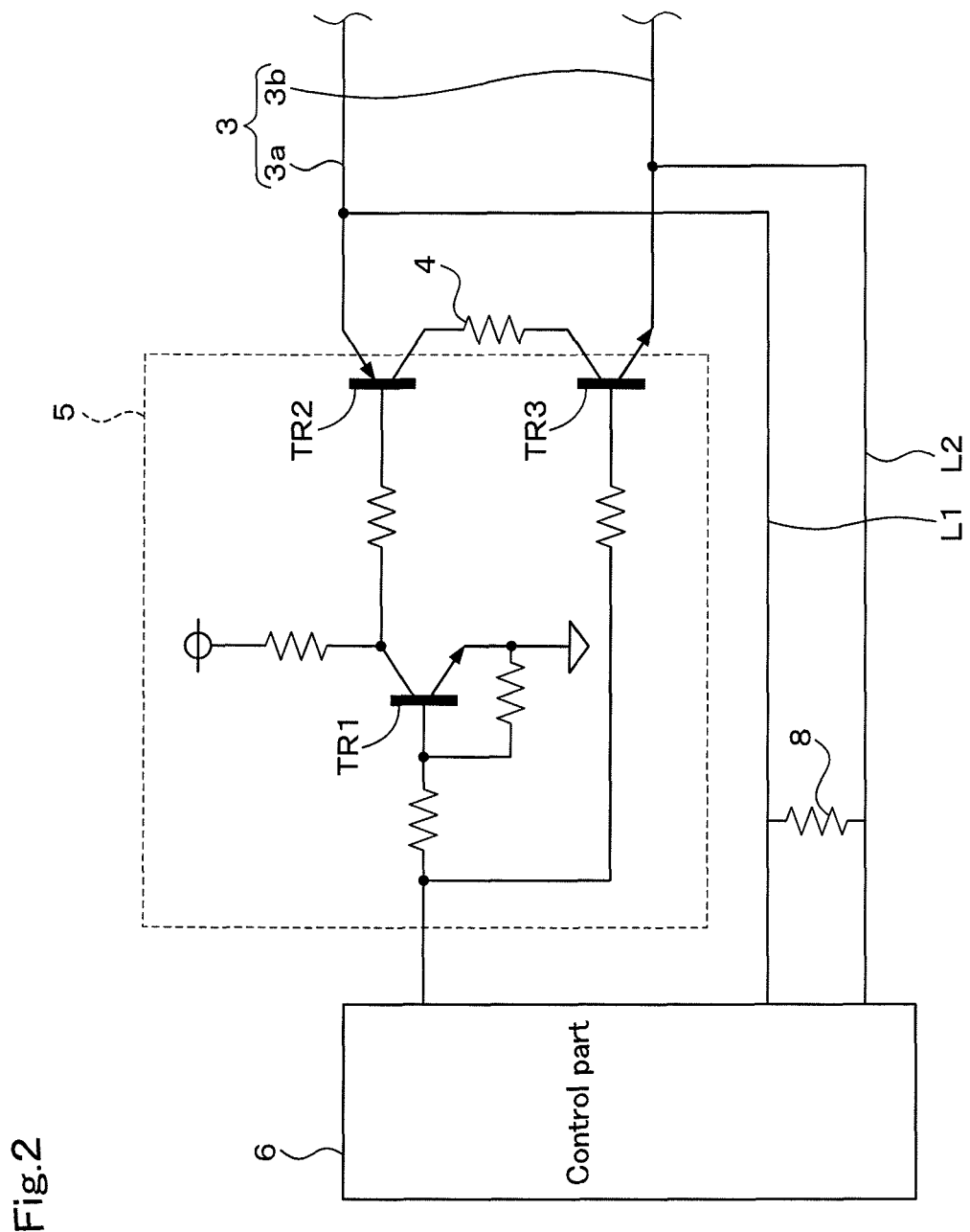
FIG. 2 is a detailed view of a switch part according to the first embodiment.

As shown in FIG. 1 and FIG. 2, the termination resistor 4 can be connected to the in-vehicle (the communication lines 3). The switch part 5 is a switch configured to be switched between a connection state where the termination resistor 4 is connected to the in-vehicle network and a non-connection state where the termination resistor 4 is not connected to the in-vehicle network.

As shown in FIG. 2, the switch part 5 switches the termination resistor 4 between the connection state and the non-connection state by using three switching elements (for example, a transistor TR).

In particular, the switch part 5 includes a transistor TR1, a transistor TR2, and a transistor TR3, the transistor TR1 being connected to the control part 6, the transistor TR2 being connected to the transistor TR1, the transistor TR3 being connected between an output terminal of the control part 6 and the transistor TR1.

A base of the transistor TR1 is connected to the output terminal of the control part 6. An emitter of the transistor TR1 is connected to the ground. A collector of the transistor TR1 is connected to a base of the transistor TR2. A power source line is connected to the base of the transistor TR2, the power source line supplying 5V and the like same as the control part 6. An emitter of the transistor TR2 is connected to the first communication line 3a. One end of the termination resistor 4 is connected to a collector of the transistor TR2. In addition, the other end of the termination resistor 4 is connected to a collector of the transistor TR3. The second communication line 3b is connected to an emitter of the transistor TR3. A base of the transistor TR3 is connected to a line connecting the base of the transistor TR1 and the output terminal of the control part 6 to each other.

When a connection signal (for example, 5V) is outputted from the output terminal of the control part 6 to the transistor TR1, an electric potential of the first communication line 3a, that is, the CANH is constantly within 2.5 to 5V in the CAN communication, an electric potential of the second communication line 3b, that is, the CANL is constantly within 0 to 2.5V in the CAN communication, and thereby the transistor TR1, the transistor TR2, and the transistor TR3 are turned on. When the transistor is turned on, the termination resistor 4 is connected to the first communication line 3a and to the second communication line 3b at both ends of the termination transistor 4. On the other hand, when the control part 6 stops outputting the connection signal to the transistor TR1, that is, outputs a non-connection signal (for example, 0V), the transistor TR1, the transistor TR2, and the transistor TR3 are turned off. When the transistors are turned off, the termination resistor 4 is disconnected from the first communication line 3a and the second communication line 3b. Briefly, when the control part 6 outputs the connection signal to the switch part 5, the termination resistor 4 is in the connection state, and when the control part 6 stops outputting the connection signal (outputs the non-connection signal), the termination resistor 4 is in the non-connection state.

The switch part 5 is constituted of three transistors TR in the above described embodiment; however, the switch part 5 may employ any configuration as long as the configuration can connect the termination resistor 4 to the first communication line 3a and the second communication line 3b and can disconnect the termination resistor 4 from the first communication line 3a and the second communication line 3b on the basis of the signal outputted from the control part 6, the termination resistor 4 being arranged between the first communication line 3a and the second communication line 3b.

In addition, as shown in FIG. 2, it is preferred that at least one of the plurality of control devices (electronic devices) 2 is provided with a compensation resistor 8, the compensation resistor 8 being configured to compensate the communication. That is, it is preferred that the compensation resistor 8 is disposed between a first line L1 and a second line L2, the compensation resistor 8 having a resistance value (for example, 2 kΩ) that is equal to or less than 3 kΩ and gives little influence to a path impedance; the first line L1 and the second line L2 serve as an input and output part of the control part 6 connected to the in-vehicle network, the first line L1 connecting the control part 6 to the first communication line 3a, the second line L2 connecting the control part 6 to the second communication line 3b.

The control part 6 is constituted of a CPU and the like, and outputs the control signal to a controlled object on the basis the various input signals described above. In addition, the control part 6 outputs the connection signal and the non-connection signal to the switch part 5 to switch the switch part 5.

The outputting of the connection signal and the non-connection signal by the control part 6 (the switching operation of the switch part 5) is carried out based on information, the information being preliminarily stored in the storage part 7.

Firstly, the switching operation of the switch part 5 will be explained, the switching operation being based on the information preliminarily stored in the storage part 7.

The storage part 7 is constituted of a nonvolatile memory and the like, and stores identification information used for identifying the control devices 2 (the electronic devices). The identification information is, for example, an ID given individually to the control devices 2. The ID is indicated by a number and the like, and the ID number is allocated based on arrangement on the in-vehicle network.

In the embodiment, as shown in FIG. 1, the first control device 2A, the second control device 2B, the third control device 2C, and the fourth control device 2D are arranged in the order of description from one end of the communication line 3 to the other end of the communication line 3. Thus, the smallest value (for example, ID=000) is given to the ID number of the first control device 2A arranged on the one end of the communication line 3, the ID number of the first control device 2A being the smallest among the IDs given on the in-vehicle network. In addition, the largest value (for example, ID=300) is given to the ID number of the fourth control device 2D arranged on the other end of the communication line 3, the ID number of the fourth control device 2D being the largest among all of the IDs given on the in-vehicle network. Moreover, the second smallest value (for example, ID=100) is given to the ID number of the second control device 2B, and the third smallest value (for example, ID=200) is given to the ID number of the third control device 2C.

That is, when the control devices 2 arranged on the in-vehicle network are seen, the ID numbers of the control devices 2 are set to gradually increase in the order from one end of the communication line 3 to the other end of the communication line 3. In particular, each of the ID numbers of the control devices 2 arranged on terminations of the in-vehicle network (the communication line 3) is set to a value being the largest or the smallest among all the ID numbers. Each of the storage parts 7 of the control devices 2 stores the ID number preliminarily determined on the basis of the arrangement on the in-vehicle network as described above.

Then, each of the storage parts 7 of the control devices 2 stores: a command for setting the termination resistor 4 to the connection state (a connection command); or a command for setting the termination resistor 4 to the non-connection state (a non-connection command). FIG. 3 is a view summarizing a relation between the ID numbers of the control devices 2; and the connection determination commands (the connection command and the non-connection command).

As shown in FIG. 3, the connection command is stored in the storage parts 7 of the first control device 2A and the fourth control device 2D. The non-connection command is stored in the second control device 2B and the third control device 2C. That is, when a whole of the communication line 3 is seen, the connection command is set to the first control device 2A and to the fourth control device 2D, each of the first control device 2A and the fourth control device 2D being arranged on the one and or the other end. In addition, the non-connection command, not the connection command, is set to the second control device 2B and to the third control device 2C, each of the second control device 2B and the third control device 2C being arranged on an intermediate portion of the communication line 3.

In this manner, when the connection determination command is stored in each of the storage parts 7 of the control devices 2, the control part 6 operates as follows to switch the switch part 5.

For example, a key cylinder is operated, the key cylinder being disposed around the operator seat 16 of the tractor 1, and thus an electric power of a battery is supplied to each of the control devices 2. After that, the control part 6 accesses the storage part 7 to read the connection determination command.

Here, when the connection command is stored in the storage part 7, the control part 6 outputs the connection signal to the switch part 5, and thus switches the switch part 5 to the connection state. When the non-connection command is stored in the storage part 7, the control part 6 outputs the non-connection signal to the switch part 5, and thus switches the switch part 5 to the non-connection state.

Meanwhile, it is preferred to store the connection determination command to the storage part 7 in manufacture of the tractor 1 or in maintenance for adding a new control device (electronic device) 2. For example, the ID number is set to each of the control devices 2 mounted on the tractor 2 in the manufacture of the tractor 1 firstly. In the setting of the ID numbers, the largest value or the smallest value is given to the ID number of the control device 2 arranged on the termination of the communication line 3.

Then, a write table is prepared, the write table relating the connection command to the control device 2 given the ID number of the largest value and to the control device 2 given the ID number of the smallest value and relating the non-connection command to the other control devices 2. After the preparation of the write table, a writing device (for example, a writer) having the write table (data relating the ID numbers to the connection determination command) is connected to the in-vehicle network of the tractor 1, and thus the connection determination command is written to the storage part 7 of the control device 2 corresponding to the ID number indicated in the write table. In this manner, the connection determination command can be stored to the storage parts 7 of the control devices 2 in the manufacture of the tractor 1.

In the maintenance for adding a new control device (electronic device) 2, the writing device is connected to the in-vehicle network of the tractor 1, and then the ID number of the control device 2 is read (extracted), the control device 2 being mounted on the tractor 1. Then, the extracted ID number is compared to the ID number of the newly-added control device 2, and the connection command is written to the newly-added control device 2 by using the writing device when the ID number of the newly-added control device 2 is the largest value or the smallest value. The connection command previously written to the control device 2 is erased in the writing of the connection command to the newly-added control device 2 (rewritten by the non-connection command), the connection command previously written to the control device 2 being related to the ID number of the largest value or the smallest value before the addition of the control device 2. Meanwhile, when the ID number of the newly-added control device 2 is not the largest value or the smallest value after comparison of the ID number of the newly-added control device 2 with the extracted ID number, the writing of the connection command is not performed. In this manner, the connection determination command can be written to the control device 2 in the maintenance for adding the new control device (electronic device) 2.

As described above, in the control device (electronic device) 2, the storage part 7 preliminarily stores the connection determination command, and the control part 6 refers to the connection determination command when the engine starts, the connection determination command being stored in the storage part 7, and sets the termination resistor 4 on the in-vehicle network on the basis of the connection determination command. In this manner, the termination resistor 4 can be switched by the control of the control part 6 without expressly switching the termination resistor 4 manually as in the conventional technique.

In the above described first embodiment, the connection determination command is preliminarily stored in the storage part 7 before the engine start, and the switch part 5 is switched on the basis of the connection determination command stored in the storage part 7; however, the switch part 5 may be switched on the basis of the connection determination command inputted to the control part 6 from the outside.

Second Embodiment

A second embodiment is an embodiment where the switch part 5 is switched on the basis of the connection determination command inputted to the control part 6 from the outside.

Figure 4:
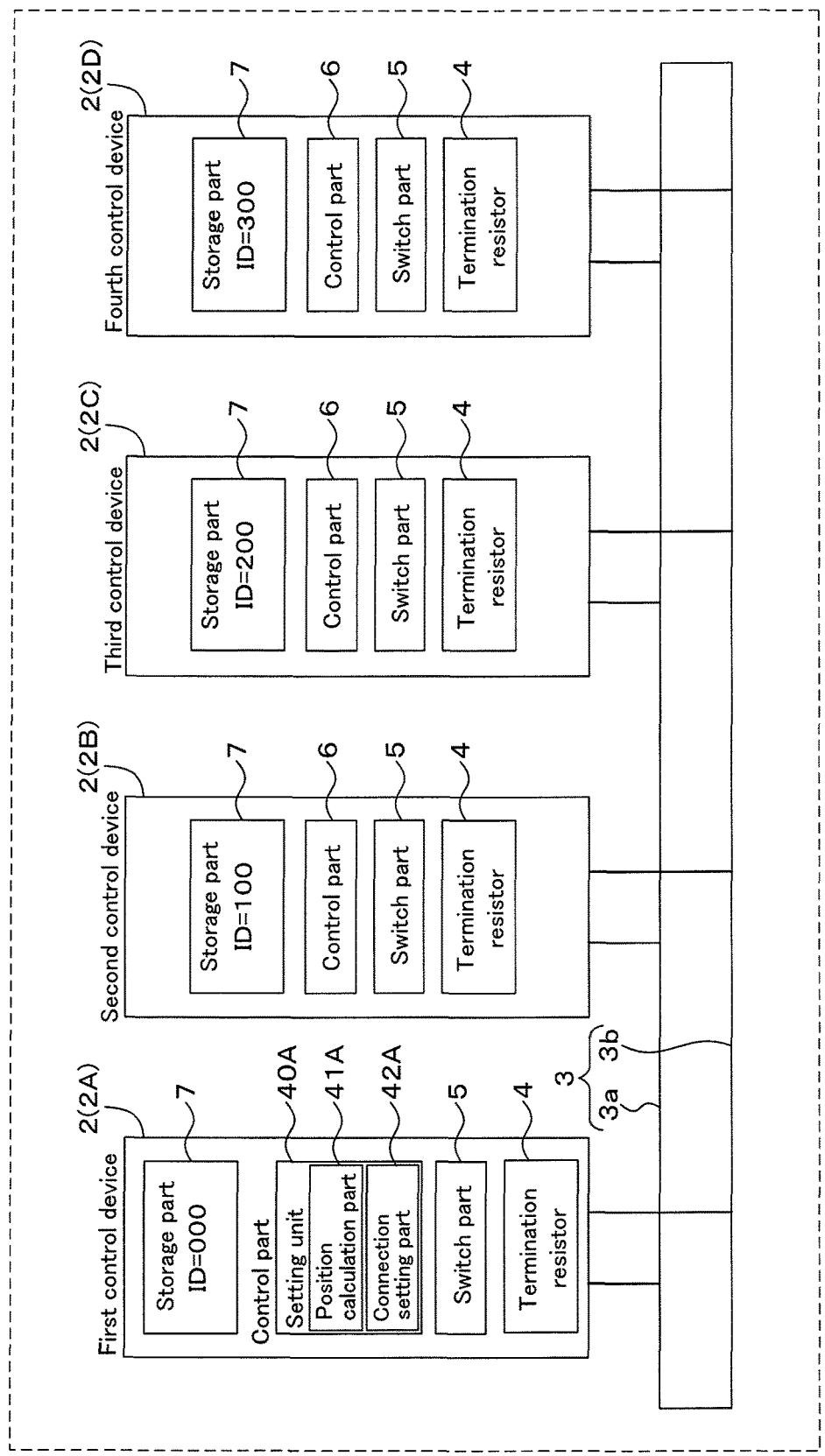
FIG. 4 is an overall view of an in-vehicle network according to a second embodiment of the present invention.

FIG. 4 is an overall view of an in-vehicle network according to the second embodiment. Here, in explanation of the second embodiment, explanations of the configurations same as the above-described configurations of the first embodiment are omitted.

As shown in FIG. 4, at least one of the plurality of control devices (electronic devices) 2 includes a setting unit 40A. The setting unit 40A is constituted of a computer program and the like stored in the control part 6 of the control device 2.

In particular, one of the first control device 2A, the second control device 2B, the third control device 2C, and the fourth control device 2D each arranged on the in-vehicle network, that is, the first control device 2A includes the setting unit 40A. For convenience in the following explanation, the first control device 2A including the setting unit 40A is referred to as a "setting control device", and the control devices (the second control device 2B, the third control device 2C, and the fourth control device 2D) not including the setting unit 40A may be referred to as a "non-setting control device".

The setting unit 40A of the first control device 2A sets the connection of the termination resistor 4 included in each of the control devices 2 on the basis of positions of the control devices 2, the position being on the in-vehicle network.

The setting unit 40A includes a position includes a position calculation part 41A and a connection setting part 42A.

The position calculation part 41A obtains the ID numbers of the control devices 2 arranged on the in-vehicle network, and calculates the position of a predetermined control device 2 on the in-vehicle network on the basis of the obtained ID numbers. For example, an electric power of the battery is supplied to each of the control devices 2 when the engine starts (the key cylinder is operated), and then the control devices 2 start up. In this case, the position calculation part 41A firstly obtains the ID number of the setting control device 2A from the storage part 7, and obtains the ID numbers of the non-setting control devices 2B, 2C, and 2D through the communication. That is, the position calculation part 41A obtains all of the ID numbers allocated to the control devices 2.

Meanwhile, the obtain of the ID numbers of the non-setting control devices may be performed by the setting control device 2A: requesting the ID numbers from the non-setting control devices 2B, 2C, 2D; and obtaining the ID numbers returned in response to the request. Or, the obtain may be performed by obtaining the ID numbers outputted from the non-setting control devices 2B, 2C, and 2D to the communication line 3 automatically when the engine starts. There is a possibility that the termination resistors are not in the proper connection state at this moment, and accordingly the compensation resistor 8 mentioned above is provided in order to enable the communication even when all the control devices 2 set the termination resistors 4 to the non-connection state.

After the obtain of the ID numbers, the position calculation part 41A refers to all of the obtained ID numbers, and extracts an ID number of the smallest value (the smallest ID number) and an ID number of the largest value (the largest ID number) from among the ID numbers. Then, the position calculation part 41A determines that the first control device 2A corresponding to the smallest ID number and the fourth control device 2D corresponding to the largest ID number are located on the terminations of the communication line 3 (terminations of the in-vehicle network). In other words, of the four control devices 2 arranged on the in-vehicle network, the second control device 2B and the third control device 2C are determined to be located not on the terminations but on the intermediate positions except the first control device 2A and the fourth control device 2D.

The connection setting part 42A sets the termination resistors 4 of the control devices 2 to be connected on the basis of the positions of the control devices 2 calculated by the position calculation part 41A, the control devices 2 being arranged on the in-vehicle network. That is, the connection setting part 42A forms a first configuration table (refer to FIG. 3) where the ID number and the connection determination command are related to each other, based on the positions of the control devices 2.

In particular, the first control device 2A and the fourth control device 2D are considered to be on the terminations of the communication line 3, and accordingly the connection setting part 42A relates the connection command to the ID number (ID=000) of the first control device 2A, and relates the connection command to the ID number (ID=300) of the fourth control device 2D. In addition, the connection setting part 42A relates the non-connection command to the ID number (ID=100) of the second control device 2B, and relates the non-connection command to the ID number (ID=200) of the third control device 2C. Then, the connection setting part 42A forms the first configuration table relating the connection determination command to all the ID numbers, and stores the formed first configuration table to the storage part 7 and the like.

In addition, the connection setting part 42A outputs the connection command to the control parts 6 of the first control device 2A and the fourth control device 2D, the first control device 2A and the fourth control device 2D being considered to be on the terminations of the communication line 3. The connection setting part 42A outputs the non-connection command to the control parts 6 of the second control device 2B and the third control device 2C, the second control device 2B and the third control device 2C being considered not to be on the terminations of the communication line 3.

The control parts 6 of the first control device 2A and the fourth control device 2D output the connection signal to the switch parts 5 when the connection command is inputted, and thus switch the switch parts 5 to the connection state. The control parts 6 of the second control device 2B and the third control device 2C output the non-connection signal to the switch parts 5 when the non-connection command is inputted, and thus switch the switch parts 5 to the non-connection state.

As described above, according to the second embodiment, at least one of the control devices 2 connected to the in-vehicle network includes the setting unit 40A, and the control device (setting control device) 2A having the setting unit 40A outputs the connection determination command to the non-setting control devices 2B, 2C, and 2D. In this manner, of the plurality of control devices 2 connected to the in-vehicle network, the connection of the termination resistor 4 can be easily completed by the setting control device 2, the termination resistor 4 being included in the non-setting control device 2.

In the second embodiment described above, the position calculation part 41A of the setting control device 2A calculates a position of the control device 2 when the engine starts; however, the position calculation part 41A may calculate the position of the control device 2, for example, at an interval of predetermined time (for example, every few minutes). Here, the predetermined time means not only that a time interval is constant but also that the time interval is variable.

In addition, it is desired for the connection setting part 42A to set the connections of the termination resistors 4 included in the control devices 2 (to form the first configuration table) every time when the position calculation part 41A calculates the positions of the control devices 2. And, when the connection of the termination resistor 4 has been changed from the previous connection (contents of the first configuration table have been changed from the previous contents), the connection setting part 42A outputs the connection determination command to the control devices 2, the connection determination command being indicated in the first configuration table. In this manner, the positions of the control devices 2 can be checked at an interval of predetermined time, the control devices 2 being connected to the in-vehicle network, and the positions of the termination resistors 4 can be changed appropriately on the in-vehicle network when the positions of the control devices 2 have been changed.

Meanwhile, in the embodiment described above, the positions of the control devices 2 are calculated at an interval of predetermined time, and the connections are set on the basis of the position calculated at an interval of predetermined time. Instead of that, the position calculation part 41A may calculate the positions of the control devices 2 on the in-vehicle network when the number of the control devices 2 connected to the in-vehicle network changes.

Figure 5B:
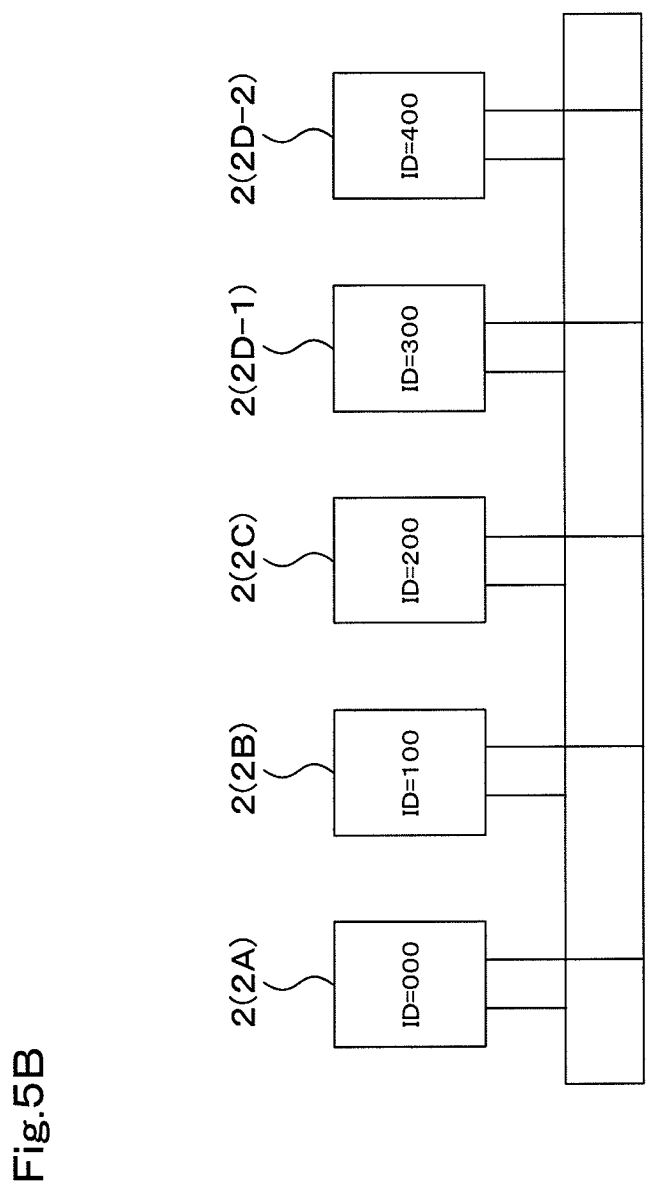
FIG. 5B is a view showing a case where the number of electronic devices mounted on a tractor is five.

For example, as shown in FIG. 5A, four of the control devices 2A, 2B, 2C, and 2D are connected to the in-vehicle network. Under that condition, consider that the working tool 14 is detached, another working tool 14 is attached, and thus, two of the fourth control devices 2D-1 and 2D-2 are connected as shown in FIG. 5B, the fourth control devices 2D-1, and 2D-2 serving as the devices for controlling the another working tool 14. In that case, the first control device (the setting control device) 2A detects, on the basis of the communication contents, the connection of two of the fourth control devices 2D-1 and 2D-2, that is, the addition of the control devices 2.

When detecting the addition of the control device 2, the position calculation part 41A obtains the ID numbers of the control devices 2 (the first control device 2A, the second control device 2B, the third control device 2C, the fourth control device 2D-1, and the fourth control device 2D-2), the control devices 2 being arranged on the in-vehicle network.

The position calculation part 41A refers to all of the obtained ID numbers after the ID numbers are obtained.

For example, under a condition where: the ID number (ID=000) corresponding to the first control device 2A is the "smallest ID number"; and the ID number (ID=400) corresponding to the fourth control device 2D-2 is the "largest ID number" as shown in FIG. 5B, the position calculation part 41A determines that the first control device 2A and the fourth control device 2D-2 are arranged on the terminations of the communication line 3 (on the terminations of the in-vehicle network), the first control device 2A corresponding to the smallest ID number, the fourth control device 2D-2 corresponding to the largest ID number. Then, the connection setting part 42A forms the first configuration table shown in FIG. 6, and outputs the connection determination command to the control devices 2 on the basis of the first configuration table.

In the above description, the conditions (the position and the number) of the control device 2 may change on the in-vehicle network as shown in FIG. 5A and FIG. 5B when the working tool 14 attached to the tractor 1 is replaced. Even in that case, the termination resistor 4 of the fourth control device 2D-2 is changed to the termination resistor 4 of the fourth control device 2D previously connected, the fourth control device 2D-2 being newly connected to the in-vehicle network, and is connected to the in-vehicle network, thereby making the communication in the in-vehicle network steady.

Meanwhile, the first control device 2A is provided with the setting unit 40A in the second embodiment; however, the other control devices 2B, 2C, and 2D may be provided with the setting unit 40A. In addition, it is preferred for the setting unit 40A to be disposed on a device not intended to be replaced essentially, the device being one of all the electronic devices (the control devices) 2 mounted on the tractor 1. For example, it is preferred for the setting unit 40A to be disposed on the first control device 2A for controlling the whole of the tractor 1, on the second control device 2B for controlling the engine 11, or on the third control device 2C for controlling the display device.

In the second embodiment described above, the control part 6 of the control device 2 switches the switch part 5 on the basis of the connection determination command inputted to the control part 6; however, instead of the switching operation, the switch part 5 may be switched on the basis of the identification information (the ID number).

Third Embodiment

A third embodiment is an embodiment where the switch part 5 is switched on the basis of the identification information (the ID number) inputted to the control part 6. Here, in explanation of the third embodiment, explanations of the configurations same as the above-described configurations of the first embodiment and the second embodiment are omitted. For convenience in the following explanation, the control device 2 indicating oneself (itself) is referred to as a "self (own) control device", and a position of the self control device is referred to as a "self position", and the control device other than the self control device is referred to as a "different (another) control device".

Figure 7:
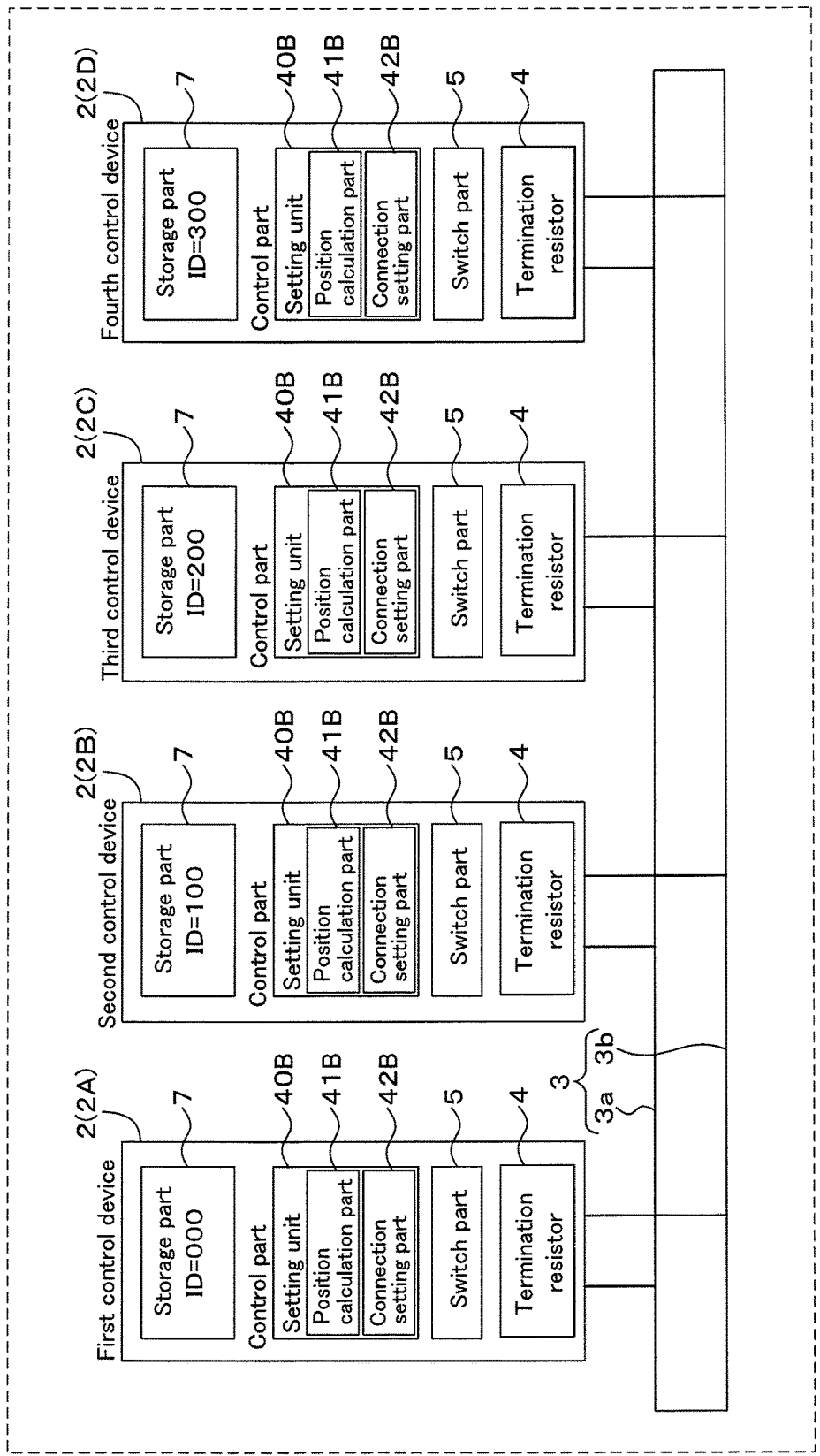
FIG. 7 is an overall view of an in-vehicle network according to a third embodiment of the present invention.

FIG. 7 is an overall view of an in-vehicle network according to the third embodiment.

As shown in FIG. 7, each of the control devices (electronic devices) 2 includes a setting unit 40B. The setting unit 40B is constituted of a computer program and the like stored in the control part 6.

In particular, each of the first control device 2A, the second control device 2B, the third control device 2C, and the fourth control device 2D includes the setting unit 40B. The setting units 40B (the control parts 6 of the control devices 2) controls the switching operation of the switch part 5 on the basis of the identification information (first identification information) and the identification information (second identification information), the first identification information being given to the self control device 2, the second identification information being given to the different control device 2. In other words, the setting unit 40B calculates a self position of the self control device 2 on the basis of the first identification information and the second identification information, the self position being on the in-vehicle network, and sets the termination resistor 4 on the basis of the calculated self position.

To be more detailed, each of the setting units 40B of the control devices 2 includes a position calculation part 41B and a connection setting part 42B.

When an electric power is supplied, the position calculation part 41B obtains the ID number (the first identification information) of the self control devices 2 from the storage part 7, and obtains the ID number (the second identification information) of the self control devices 2 through the network communication. For example, the position calculation part 41B of the third control device 2C obtains the "ID=200" that is the first identification information, and obtains the "ID=000, 100, and 300" that is the second identification information.

Meanwhile, the second identification information may be obtained by the self control device 2: requesting the ID number from the different control device 2 to obtain the ID number returned in response to the request; or obtaining the ID number automatically outputted by the different control device 2 to the communication line 3 at the engine start.

After the obtain of the ID numbers, the position calculation part 41B refers to all of the obtained ID numbers, and calculates an order of the first identification information (the ID number of the self control device 2) in all of the ID numbers. For example, in the third control device 2C, the first identification information is "ID=200", the second identification information is "ID=000, 100, and 300", and the first identification information is in third place from the head (ID=000), and accordingly the position calculation part 41 of the third control device 2C determines that the order of the first identification information (the ID number) is third.

Next, when the order of the first identification information is not the highest order or the lowest order, the position calculation part 41B determines that the self position of the self control device 2 is located not on the terminations but on the intermediate position. For example, as described above, the order of the first identification information (the ID number) of the third control device 2C is not first or fourth but third, and thus the position calculation part 41B of the third control device 2C determines that the self position of the self control device 2 is the "intermediate position".

On the other hand, when the order of the first identification information is the highest order or the lowest order, the position calculation part 41B determines that the self position of the self control device 2 is located on the termination. For example, the ID number of the first control device 2A is "ID=000", and thereby the order is first. In that case, the position calculation part 41B of the first control device 2A determined that the self position of the self control device 2 is the "termination".

The connection setting part 42B sets the connection of the termination resistor 4 of the self control device 2 on the basis of the position of the control device 2, the position being calculated by the position calculation part 41B. For example, since the self position is not the terminations but the intermediate position, the connection setting part 42B of the third control device 2C outputs the non-connection command to the control part 6 of the third control device 2C to hold the switch part 5 in the non-connection state. On the other hand, since the self position is the termination, the connection setting part 42B of the fourth control device 2D outputs the connection command to the control part 6 of the fourth control device 2D to hold the switch part 5 in the connection state.

As described above, according to the third embodiment, the self position is calculated based on the first identification information (the ID number) of the self control device 2 and the second identification information (the ID number) of the different control device 2, thereby easily completing the connection of the termination resistor 4 included in the self control device 2.

Meanwhile, in the third embodiment described above, the position calculation part 41B refers to all of the obtained ID numbers, and calculates an order of the ID number of the self control device 2 in all of the ID numbers; however, it may be calculated directly whether the self position of the self control device 2 is the termination, omitting the calculation of the order.

Fourth Embodiment

A fourth embodiment is an embodiment where the switch part 5 is switched on the basis of the connection determination command outputted from the outside of the in-vehicle network. Here, also in explanation of the fourth embodiment, explanations of the configurations same as the above-described configurations of the first embodiment to the third embodiment are omitted.

Figure 8:
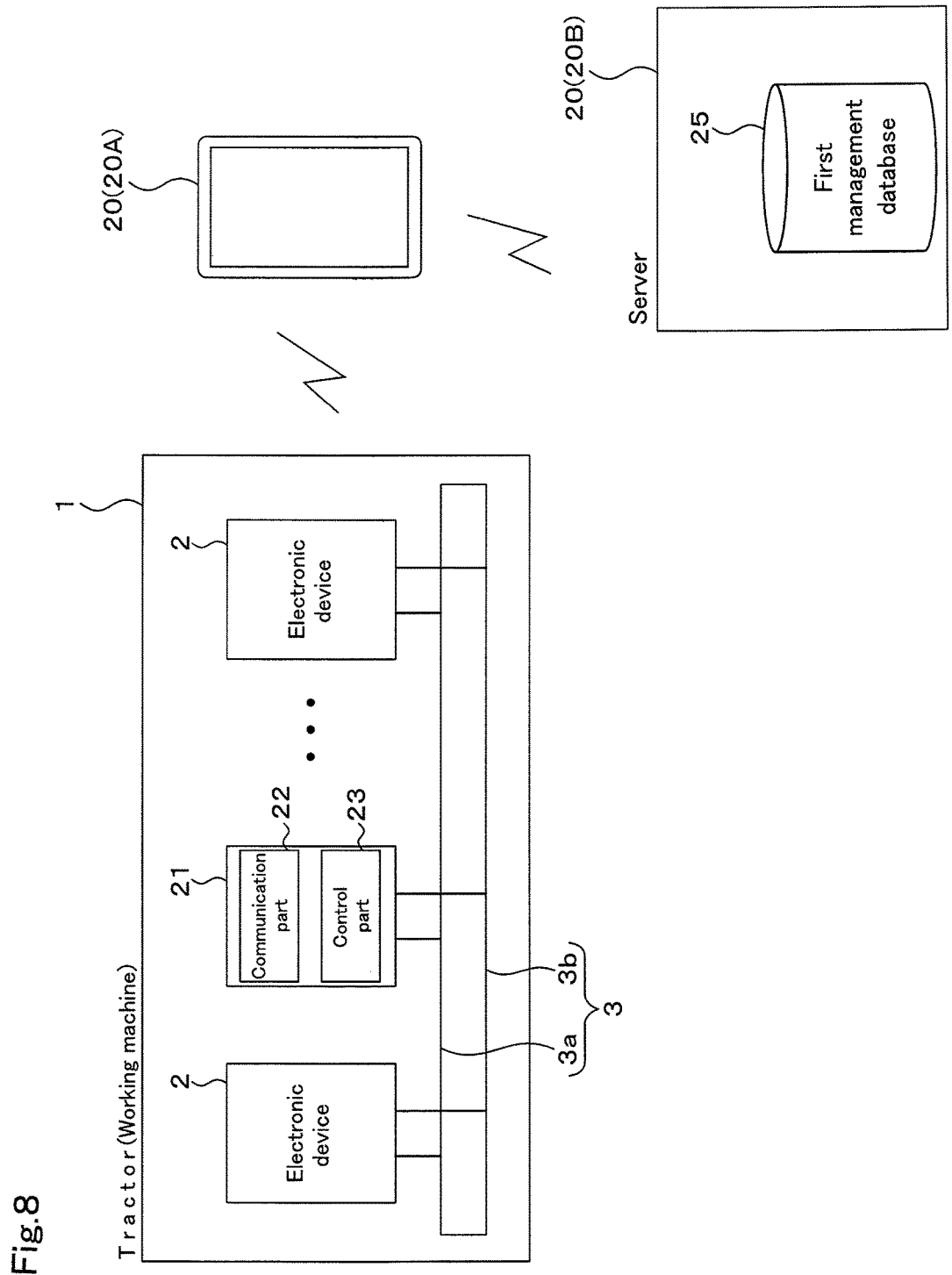
FIG. 8 is a view showing a relation between an external network and an in-vehicle network according to a fourth embodiment.

FIG. 8 is an overall view of a communication network showing a relation between an external network and an in-vehicle network according to the fourth embodiment.

As shown in FIG. 8, an external device 20 and a communication device 21 are arranged on the communication network in addition to the electronic devices 2, the communication device 21 being configured to be connected to the external device 20. Here, the external device 20 is a device disposed on the outside when seen from the tractor 1 (the in-vehicle network). The external device 20 is constituted of an information terminal 20A and a server 20B, for example, the information terminal 20A being configured to be connected to the communication device 21, the server 20B being configured to be connected to the information terminal 20A. The explanation of the embodiment will be described below, showing the information terminal 20A and the server 20B as examples of the external device 20.

The communication device 21 is one of the electronic devices mounted on the tractor 1, and is a device having a wireless communication system. In particular, the communication device 21 connects the in-vehicle network of the tractor 1 to the external network, the external network being constituted of the information terminal 20A, the server 20B, and the like, and is connected to the in-vehicle network of the tractor 1 by a connector.

The communication device 21 includes a communication part (a communication module) 22 and a control part 23, the communication part 22 being configured to communicate with the information terminal 20A in a wireless communication, the control part 23 being configured to control the communication part 22.

The communication part 22 performs wireless communication using the Wi-Fi (a registered trademark) compliant with the IEEE802.11 series that is a communication standard, and performs wireless communication based on a mobile phone communication network and the like. The communication part 22 converts received data (a signal) so as to conform with a communication system of the communication device 21 and outputs the converted data, and the communication part 22 converts data (a signal) sent from the control part 23 so as to conform with a communication system of the IEEE802.11 series or with a communication system of the mobile phone communication network and outputs the converted data to the external network. That is, the communication part 22 outputs data (a signal) to the control part 23, the data being sent from the information terminal 20A and the server 20B, after receiving the data, and sends the data (the signal) to the information terminal 20A and the server 20B, the data being outputted from the control part 23.

The information terminal 20A is, for example, constituted of a smart phone (a multifunctional mobile phone) having a relatively-higher computing ability, of a tablet PC, or the like. The information terminal 20A also communicates in wireless with the communication device 21 (the communication part 22) in the Wi-Fi (a registered trademark) compliant with the IEEE802.11 series that is a communication standard. In addition, the information terminal 20A is capable of being connected to the server 20B through a mobile phone communication network and a data communication network.

The server 20B manages the connection of the termination resistors 4 in the in-vehicle network of the tractor 1, and is installed, for example, in a sales company for selling the tractor 1, in a manufacture company for manufacturing the tractor 1, or in a service company for providing after-sales maintenance to the tractor 1. The server 20B includes a first management database 25.

The first management database 25 includes data relating the ID numbers to the connection determination commands of the termination resistors 4, the ID numbers being given to the electronic device (the control device) 2 mounted on the tractor 1. Firstly, the first management database 25 will be explained.

As shown in FIG. 9, the first management data base 25 includes a second configuration tables for each tractors, the second configuration table setting: the ID numbers of the electronic devices 2; and the connection determination commands to the termination resistors 4. That is, the first management database 25 includes the second configuration table relating identification information (machine identification information), the ID number, and the connection determination command to each other, the machine identification information identifying the tractor 1, the ID number being given to the electronic device 2 mounted on the tractor 1 corresponding to the machine identification information.

The second configuration table is formed in the manufacturing of the tractor 1, in the selling of the tractor 1, in the maintenance to the tractor 1, or the like, and is formed by connecting a computer such as the information terminal 20A to the server 20B.

Figure 10:
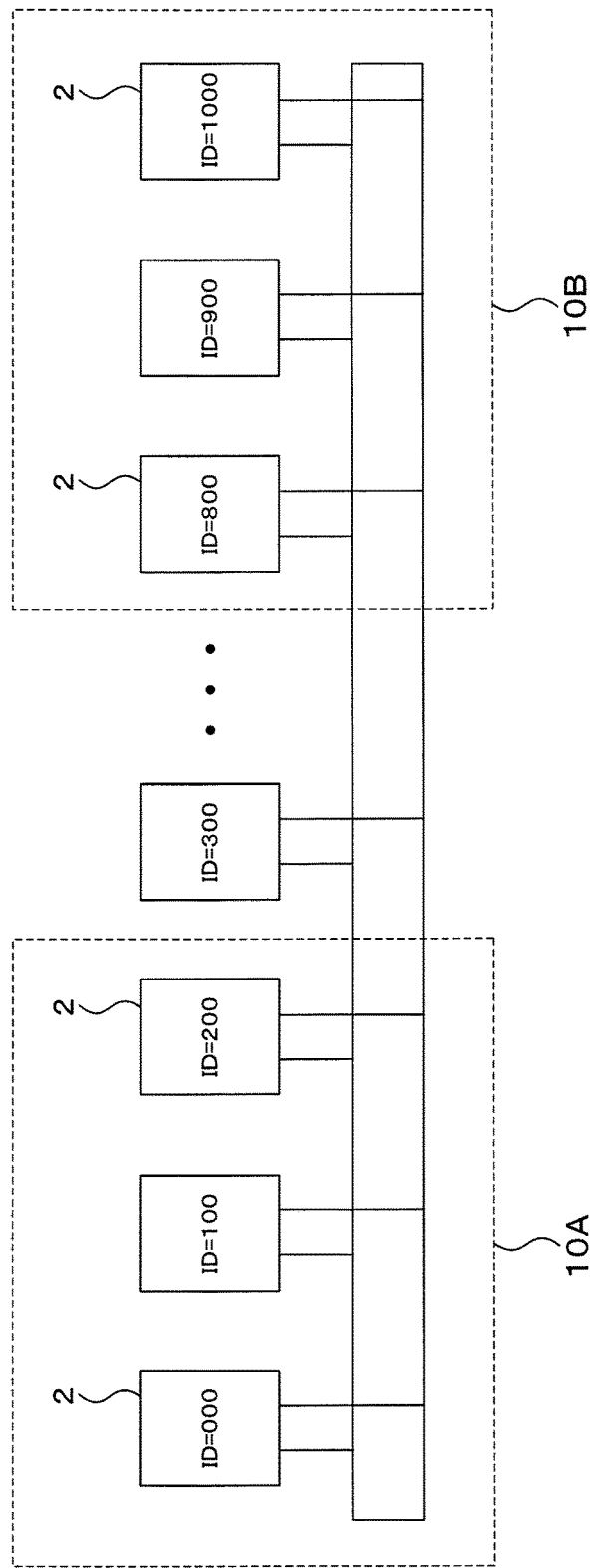
FIG. 10 is a view showing an example where a plurality of electronic devices are connected.

For example, the plurality of electronic devices 2 shown in FIG. 10 are mounted on a tractor of the machine identification information "M135-0154889". In that case, of the plurality of electronic devices 2, the ID numbers of the electronic devices 2 constituting a head group (for example, the electronic devices 2 surrounded by an area 10A) is small, the head group being connected to one end side (a head side) of the communication line 3, the ID numbers of the electronic devices 2 constituting a tail group (for example, the electronic devices 2 surrounded by an area 10B) is large, the tail group being connected to the other end side (a tail side) of the communication line 3, as shown in FIG. 9 and FIG. 10.

Meanwhile, it is preferred to preliminarily assume, in the designing or manufacturing of the tractor 1 of the machine identification information "M135-0154889", which electronic devices 2 can be mounted on the tractor 1 and to determine, based on the known arrangement of the electronic devices 2, the allocation of the plurality of electronic devices 2 to the head group and to the tail group. That is, the maximum number of the electronic devices 2 and the arrangement of the electronic devices 2 are preliminarily assume in the designing or manufacturing of the tractor 1, the electronic devices 2 being able to be mounted on the tractor 1. Then, it is preferred to determine the electronic devices 2 included in the head group and the electronic devices 2 included in the tail group on the basis of the arrangement of the electronic devices 2.

Next, of the electronic devices 2 included in the head group (the electronic devices 2 surrounded by an area A), the connection command is set to the ID number of at least one of the electronic devices 2. In addition, of the electronic devices 2 included in the tail group (the electronic devices 2 surrounded by an area B), the connection command is set to at least one of the electronic devices 2 (for example, ID=1000).

Figure 11:
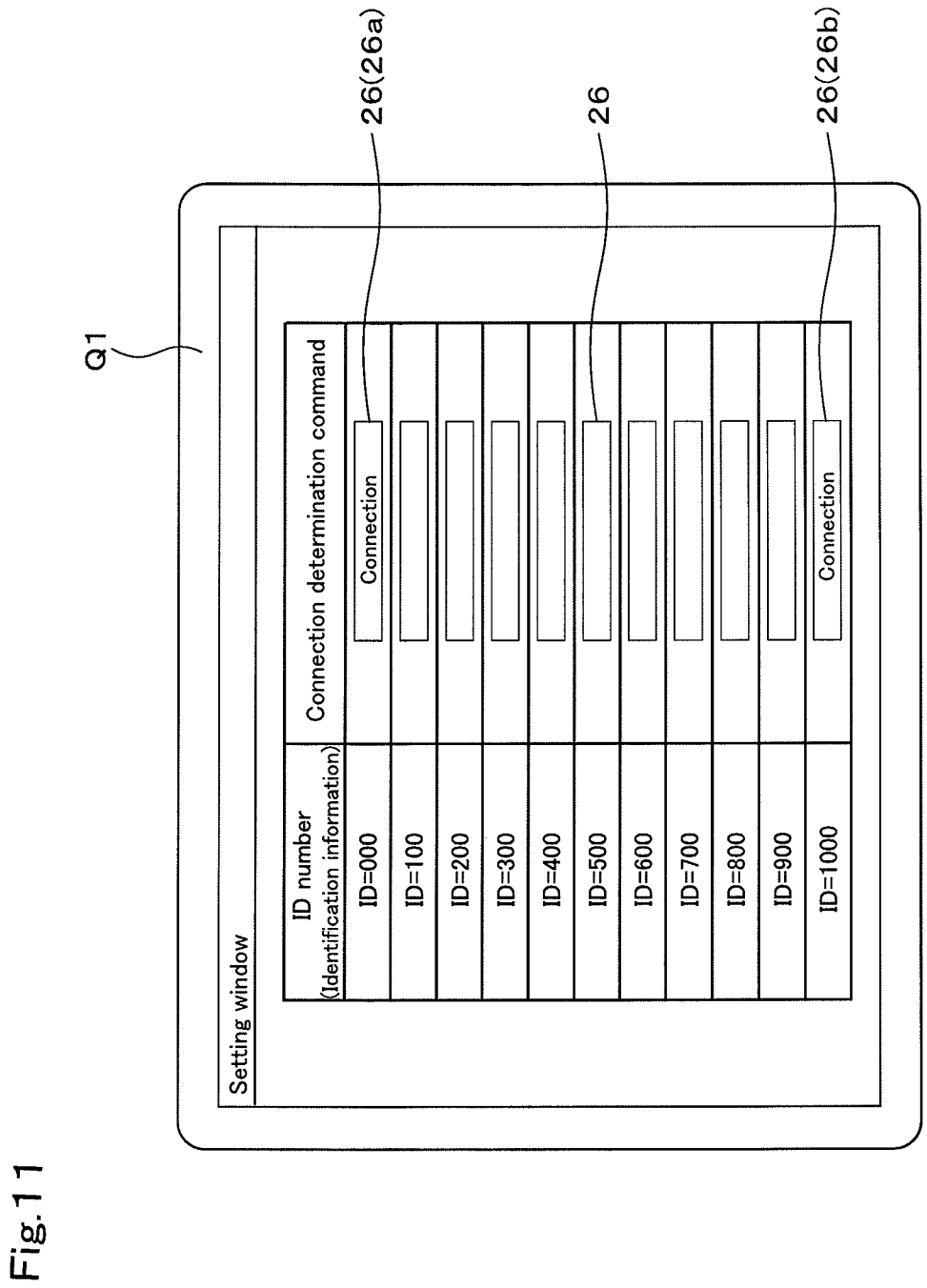
FIG. 11 is a view showing an example of a setting window.

For details, as shown in FIG. 11, the computer such as the information terminal 20A is connected to the server 20B to display a setting window Q1 on the computer. The setting window Q1 displays: a list of the ID numbers of the electronic devices 2 mounted on the tractor 1; and setting parts 26 for setting the connection determination command related to the ID number. For example, the "connection" is inputted to a setting part 26a corresponding to the ID number "ID=000" of the electronic device 2, and thus the connection command is set to the "ID=000". In the same manner, the "connection" is inputted to a setting part 26b corresponding to the ID number "ID=1000" of the electronic device 2, and thus the connection command is set to the "ID=1000".

As described above, when the computer is connected to the server 20B, the connection of the termination resistor 4 of the electronic device 2 can be determined, and the second configuration table can be formed. Meanwhile, the setting way of the connection (the forming way of the second configuration table) is not limited to the above-mentioned example, and other setting ways (forming ways) may be employed.

After the forming of the second configuration table, the information terminal 20A is connected to the server 20B, and the second configuration table is sent to the information terminal 20A, that is, the ID number and the connection determination command are sent. After that, the ID number and the connection determination command are sent from the information terminal 20A to the communication device 21. The communication device 21 outputs the ID number and the connection determination command to the control part 23 when receiving the ID number and the connection determination command, and the control part 23 outputs the ID number and the connection determination command to the in-vehicle network. And the control part 6 of each of the electronic devices 2 obtains the ID number and the connection determination command from the in-vehicle network, the ID number and the connection determination command corresponding to oneself, when the ID number and the connection determination command are inputted to the in-vehicle network, and the control part 6 outputs the connection signal to the switch part 5 when the connection command is indicated in the connection determination command. In addition, the control part 6 of each of the electronic devices 2 outputs the non-connection signal to the switch part 5 when the non-connection command is indicated in the connection determination command.

As described above, according to the fourth embodiment, since the server 20B includes the second configuration table relating the ID number and the connection determination command to each other, the ID number and the connection determination command are sent to the tractor 1, thereby setting the connection of the termination resistor 4 of the electronic device 2, the electronic device 2 being mounted on the tractor 1. Meanwhile, the server 20B includes the second configuration table; however, instead of that, the information terminal 20A may include the second configuration table, and the information terminal 20A may send the ID number and the connection determination command both indicated on the second configuration table.

In addition, in the fourth embodiment described above, the connection of the termination resistor 4 is set by using the second configuration table, the second configuration table relating the ID number and the connection determination command to each other; however, instead of that, the connection of the termination resistor 4 may be set on the basis of the ID number of the electronic device 2 mounted on the tractor 1.

A modified example of the fourth embodiment will be described below. Here, in explanation of the modified example, explanations of the configurations same as those of the above-described embodiments are omitted.

Figure 12:
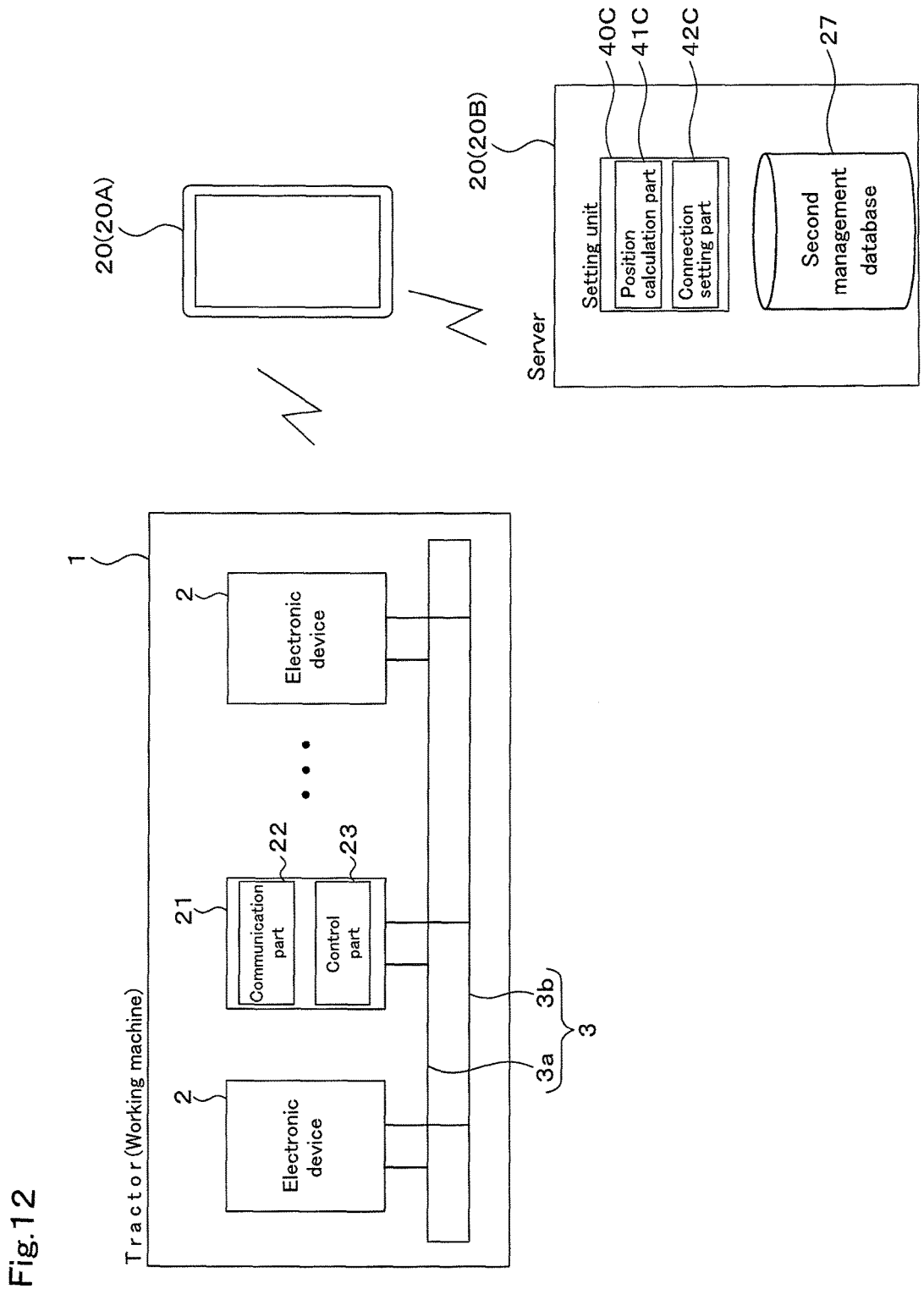
FIG. 12 is a view showing a modified example according to the fourth embodiment.

As shown in FIG. 12, the server 20B includes a second management database 27, the second management database 27 storing the ID numbers of the electronic devices 2 mounted on the tractor 1. The ID numbers indicated on the second management database 27 can be, for example, set in the manufacturing of the tractor 1, and can be added and deleted in the sale of the tractor 1, in the maintenance of the tractor, and the like. For example, the computer such as the information termination 20A is connected to the server 20B in the manufacturing of the tractor 1, in the sale of the tractor 1, or in the maintenance of the tractor 1, and the computer refers to a list of the ID numbers corresponding to predetermined tractors. And then, the computer can delete the ID number indicated on the list and can add an ID number to the list.

In addition, the server 20B includes a setting unit 40C, the setting unit 40C being configured to set the connection of the termination resistor on the basis of the ID number of the above-described second management database 27. The setting unit 40C is constituted of a computer program and the like stored in the server 20B. The setting unit 40C includes a position calculation part 41C and a connection setting part 42C.

The position calculation part 41C obtains the ID number indicated on the second management database 27, and calculates the position of the predetermined control device 2 on the in-vehicle network on the basis of the obtained ID number. For example, when the machine identification information is inputted to the server 20B, the position calculation part 41C obtains the ID number of the electronic device 2 from the second management database 27, the electronic device 2 being mounted on the tractor 1 corresponding to the machine identification information. Then, the position calculation part 41C refers to all of the obtained ID numbers, and extracts the smallest ID number (for example, ID=000) and the largest ID number (for example, ID=1000) from among the ID numbers.

Then, the position calculation part 41C determines that the electronic devices 2 corresponding to the smallest ID number (ID=000) and to the largest ID number (ID=1000) are located on the terminations of the communication line 3 (terminations of the in-vehicle network).

The connection setting part 42C forms a second configuration table where the ID number and the connection determination command are related to each other. For example, the electronic device 2 of the ID number "000" and the electronic device 2 of the ID number "1000" are located on the terminations, and accordingly the connection setting part 42C forms the second configuration table where the connection command is set to the "ID=000" and the connection command is set to the "ID=1000" as shown in FIG. 9.

After the second configuration table is formed, the connection setting part 42C sends the ID number and the connection determination command to the information terminal 20A. Then, the ID number and the connection determination command are sent from the information terminal 20A to the communication device 21. When receiving the ID number and the connection determination command, the communication device 21 outputs the received ID number and the received connection determination command to the in-vehicle network. And, when the ID number and the connection determination command are inputted to the in-vehicle network, the control parts 6 of the electronic devices 2 obtains the ID number and the connection determination command from the in-vehicle network, the ID number and the connection determination command corresponding to oneself, and when the connection command is indicated in the connection determination command, the control part 6 outputs the connection signal to the switch part 5. In addition, the control part 6 of each of the electronic devices 2 outputs the non-connection signal to the switch part 5 when the non-connection command is indicated in the connection determination command.

As described above, according to the modified example of the fourth embodiment, the server 20B and the like can easily set the termination resistor 4 of the electronic device 2 connected to the in-vehicle network only by changing the ID number stored in the second management database 27 in the sale of the tractor 1, in the maintenance of the tractor 1, or the like.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

In the embodiments described above, it is preferred to give the identification information to all of the electronic devices arranged on the in-vehicle network, but the identification information may be given to only a part of the electronic devices 2.

In other words, the identification information is not necessarily given to completely all of the electronic devices 2. In addition, the setting units 40A and 40B may be disposed on all of the electronic devices 2 arranged on the in-vehicle network, and may be disposed on only a part of the electronic devices 2. In the same manner, the termination resistor 4 may be disposed on all of the electronic devices 2 arranged on the in-vehicle network, and may be disposed on only a part of the electronic devices 2.

Moreover, in the in-vehicle network, it is preferred to connect the termination resistor to the in-vehicle network, the termination resistor being included in the electric device located on the termination; however, the termination resistor of the electronic device substantially located on a termination side (near the termination) may be connected to the in-vehicle network.

In addition, in the above-described embodiments, the compensation resistor 8 is disposed on at least one of the electronic devices 2, the compensation resistor 8 being configured to compensate the communication; however, instead of that, the control part 6 of at least one of the electronic devices 2 can output the connection signal to the switch part 5 to connect the termination resistor 4 to the in-vehicle network in the first communication, that is, before the setting of the termination resistor 4, thereby making the termination resistor 4 function as a compensation resistor. In that case, it is preferred that the termination resistor 4 functioning as the compensation resistor is set to the non-connection state after the setting of the termination resistor 4.

REFERENCE SIGNS LIST

1 Working machine (Tractor)
2 Electronic device
2A First control device
2B Second control device
2C Third control device
2D Fourth control device
3 Communication line
3a First communication line
3b Second communication line
4 Termination resistor
5 Switch part
6 Control part
7 Storage part
8 Compensation resistor
10 Travel body
11 Engine
12 Transmission gearbox
13 Three-point linkage
14 Working tool
15 Cabin
16 Operator seat
17 Display device
20 External device
20A Information terminal
20B Server
21 Communication device
22 Communication part
23 Control part
25 First management database
27 Second management database
40A, 40B, and 40C Setting unit
41A, 41B, and 41C Position calculation part
42A, 42B, and 42C Connection setting part

The invention claimed is:
1. A working machine comprising:
an engine;
a working tool mounted on the working machine;
a display device configured to display information at least related to:
a driving state of the working machine; and
operation of the working tool;
a control system comprising:
an in-vehicle network;
a first control device configured to control movement of the working tool mounted on the working machine;
a second control device configured to control the engine;
a third control device configured to control the display; and
a fourth control device configured to control the working tool,
wherein each of the first, second, third and fourth control devices comprises:
a termination resistor connectable to a first communication line and a second communication line of the in-vehicle network;
a termination resistor switch adapted to switch between a connection state where the termination resistor of a respective first, second, third or fourth control device is connected to the in-vehicle network and a non-connection state where the termination resistor of a respective first, second, third or fourth control device is not connected to the in-vehicle network;
a non-transitory data storage configured to store identification information; and
a switch control, including at least one transistor, configured to control a switching operation of the termination resistor switch,
wherein the control system has a mode of operation where the switch control:
utilizes first identification information from one of the first, second, third or fourth control device when the engine starts, said first identification information being identification information stored in the data storage of the respective, first, second, third or fourth control device;
obtains second identification information different from another of the first, second, third or fourth control device;
compares the second identification information with the first identification information;
performs a calculation based on the first and second identification information; and
either switches the termination resistor switch to the connection state based on the calculation or switches the termination resistor switch to the non-connection state based on the calculation.

2. The working machine according to claim 1, wherein the calculation is a position calculation performed by a server.

3. The working machine according to claim 1, wherein the calculation is a position calculation determining a place of order of the first and second identification information.

4. The working machine according to claim 3, wherein the place of order of the first and second identification information includes highest order and lowest order.

5. The working machine according to claim 1, wherein the termination resistor switch comprises plural transistors.

6. The working machine according to claim 1, wherein the termination resistor switch is configured to:
connect the termination resistor to the first communication line and the second communication line on a basis of a signal outputted from the switch control of a respective first, second, third or fourth control device; and disconnect the termination resistor from the first communication line and the second communication line on a basis of a signal outputted from the switch control of a respective first, second, third or fourth control device.

7. The working machine according to claim 1, wherein the non-transitory data storage comprises a nonvolatile memory.

8. The working machine according to claim 1, further comprising:
- a first line connected to the first communication line at a first portion and being configured to connect the first communication line to the switch control of the respective first, second, third and fourth control device;
- a second line connected to the second communication line at a second portion and being configured to connect the second communication line to the switch control of the respective, first, second, third and fourth control device; and
- a compensation resistor connected to the first line and the second line, the compensation resistor having a resistance value that is less than a resistance value of the termination resistor.

* * * * *